United States Patent
Werny (10) Patent No.: US 10,208,839 B2
(45) Date of Patent: Feb. 19, 2019

(54) SLIDING RAIL HALF FOR A TWO-PIECE SLIDING RAIL

(71) Applicant: Schaeffler Technologies AG & Co. KG, Herzogenaurach (DE)

(72) Inventor: Pierre Werny, Eckwersheim (FR)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 8 days.

(21) Appl. No.: 15/549,793

(22) PCT Filed: Jan. 22, 2016

(86) PCT No.: PCT/DE2016/200028
§ 371 (c)(1),
(2) Date: Aug. 9, 2017

(87) PCT Pub. No.: WO2016/127983
PCT Pub. Date: Aug. 18, 2016

(65) Prior Publication Data
US 2018/0119781 A1    May 3, 2018

(30) Foreign Application Priority Data
Feb. 13, 2015   (DE) .................. 10 2015 202 651

(51) Int. Cl.
*F16H 7/08*   (2006.01)
*F16H 7/18*   (2006.01)
(Continued)

(52) U.S. Cl.
CPC .............. *F16H 7/18* (2013.01); *F16H 9/18* (2013.01); *F16H 9/24* (2013.01); *F16H 2007/185* (2013.01)

(58) Field of Classification Search
CPC ........ F16H 7/18; F16H 9/18; F16H 2007/185; F16H 9/24; F16H 57/0489
(Continued)

(56) References Cited

U.S. PATENT DOCUMENTS 3,626,776 A * 12/1971 Staudinger et al. .. F16H 7/0848
474/111
6,435,994 B1 * 8/2002 Friedmann ................ F16H 7/18
474/111
(Continued)

FOREIGN PATENT DOCUMENTS

DE          10017005 A1    10/2000
DE    102013211748 A1     1/2014

OTHER PUBLICATIONS

English Translation of International Search Report for PCT/DE2016/200028; 2 pgs; dated Nov. 5, 2016 by the European Patent Office.

*Primary Examiner* — Henry Y Liu
(74) *Attorney, Agent, or Firm* — Lekeisha M. Suggs (57) ABSTRACT

The disclosure relates to a sliding rail half for a two-piece sliding rail, the sliding rail being set up to reduce vibrations and undulations for a wraparound means of a wraparound gear mechanism, the sliding rail half being distinguished, above all, by the fact that a first pin is arranged in a first mounting, wherein the first pin, in interaction with a hook of a second sliding rail half to be joined, prevents a displacement of the second sliding rail half relative to the first sliding rail half along a longitudinal axis when a first sliding face and a second sliding face are arranged in a sliding plane and a first joining face is in contact at least partially with a corresponding second joining face and the hook is not received in the first mounting.

16 Claims, 5 Drawing Sheets

(51) Int. Cl.
*F16H 9/18* (2006.01)
*F16H 9/24* (2006.01)

(58) Field of Classification Search
USPC .......................................................... 474/111
See application file for complete search history.

(56) References Cited

U.S. PATENT DOCUMENTS

| | | | | |
|---|---|---|---|---|
| 7,354,364 | B2* | 4/2008 | Glas | F16H 59/36 |
| | | | | 474/140 |
| 8,057,336 | B2* | 11/2011 | Wodtke | F16H 7/18 |
| | | | | 474/111 |
| 8,376,883 | B2* | 2/2013 | Inoue | F16H 9/24 |
| | | | | 474/109 |
| 9,382,982 | B2* | 7/2016 | Werny | F16H 7/18 |
| 9,458,916 | B2* | 10/2016 | Garcia | F16H 7/18 |
| 9,765,857 | B2* | 9/2017 | Werny | F16H 7/18 |
| 9,777,808 | B2* | 10/2017 | Urbanek | F16H 7/18 |
| 9,933,052 | B2* | 4/2018 | Penner | F16H 7/18 |
| 10,060,514 | B2* | 8/2018 | Nakamura | F16H 9/18 |
| 2007/0190830 | A1* | 8/2007 | Wodtke | F16H 7/18 |
| | | | | 439/153 |
| 2011/0152019 | A1* | 6/2011 | Gantner | F16H 9/24 |
| | | | | 474/8 |
| 2011/0244999 | A1* | 10/2011 | Nakamura | F16H 9/18 |
| | | | | 474/91 |
| 2014/0235390 | A1* | 8/2014 | Urbanek | F16H 7/18 |
| | | | | 474/140 |
| 2015/0176684 | A1* | 6/2015 | Werny | F16H 7/18 |
| | | | | 474/140 |
| 2016/0238111 | A1* | 8/2016 | Penner | F16H 7/18 |
| 2018/0038458 | A1* | 2/2018 | Werny | F16H 7/18 |

* cited by examiner

SLIDING RAIL HALF FOR A TWO-PIECE SLIDING RAIL

CROSS-REFERENCE TO RELATED APPLICATIONS

This application is the U.S. National Phase of PCT Appln. No. PCT/DE2016/200028 filed Jan. 22, 2016, which claims priority to DE 102015202651.5 filed Feb. 13, 2015, the entire disclosures of which are incorporated by reference herein.

TECHNICAL FIELD

The present disclosure relates to a sliding rail half for a two-piece sliding rail, and to a sliding rail, the sliding rail being set up for reducing vibrations and undulations for a wraparound means of a wraparound gear mechanism, in particular for a wraparound gear mechanism for a motor vehicle.

BACKGROUND

Wraparound gear mechanisms are known from the prior art, by way of which an infinitely variable change in the step-up transmission ratio (or step-down transmission ratio) is possible at least within ranges. To this end, two cone pulley pairs are provided that have in each case two cone pulleys. The cone pulleys are oriented in each case with their cone face toward one another and can be displaced along their common rotational axis relative to one another between a position at a maximum spacing and a position at a minimum spacing. One cone pulley is usually fixed axially and the other cone pulley can be displaced axially. In this way, a pulley wedge which is variable is formed between the cone pulleys of a cone pulley pair. The two cone pulley pairs are connected to one another in a torque-transmitting manner by means of a common wraparound means, for example a transmission chain. The wraparound means migrates radially to the outside in a cone pulley pair when the cone pulleys thereof are guided toward one another, and the wraparound means migrates radially to the inside in a cone pulley pair when the cone pulley pairs are moved apart from one another. Said movement is as a rule carried out in each case precisely in the opposite manner in a wraparound gear mechanism on the cone pulley pairs, with the result that the tensioning of the wraparound means remains (virtually) constant, while the spacing between the cone pulley pairs is fixed, and it not being necessary for a deflection mechanism or tensioning mechanism to be provided for the wraparound means.

A transmission input shaft is fixed rotationally relative to a first cone pulley pair, and a transmission output shaft is fixed rotationally relative to a second cone pulley pair which is connected in a torque-transmitting manner by means of the wraparound means. A step-up transmission ratio can be set depending on the selected spacing of the cone pulleys of a cone pulley pair from one another in relation to the selected spacing of the other cone pulley pair.

A wraparound gear mechanism of this type is known, for example, from DE 100 17 005 A1. In some fields of application, the wraparound gear mechanism is combined with a conventional manual transmission with fixed transmission gears, with the result that a greater step-up transmission ratio spread is achieved with a comparatively lower number of fixed transmission gears.

On account of the fact that the wraparound means leaves the pulley wedge which is formed between the cone pulleys of a cone pulley pair in a manner which is not tangential with respect to the connection, in particular on account of polygonal running which results from a "usually" finite pitch of a chain, and other dynamic effects while running into and running out of the pulley wedge and as a consequence of changes in the step-up transmission ratio and/or as a consequence of rotational non-uniformities and other vibrations, the wraparound means is set in vibration about the wraparound means plane. The wraparound means plane (or vibration plane for short) is the shortest tangential connection of the set effective radius of the cone pulley pairs, that is to say the spacing of the truncated pulley wedge which is formed between the cone pulleys and corresponds to the width of the wraparound means. The position of the vibration plane is therefore variable with the change in the step-up transmission ratio. The vibration plane is as a rule congruent with the center plane in the running direction of the respective run, that is to say the pulling run (or load run) or the empty run of the wraparound means. In order to reduce said vibrations, sliding rails are used in the prior art which bear against the wraparound means with as little play as possible over as long an extent as possible and thus suppress vibrations and undulations of the wraparound means. Sliding rails of this type are known, for example, from the abovementioned DE 100 17 005 A1.

It is advantageous for many applications to construct the sliding rail in two pieces, it being possible for the two sliding rail halves to be pushed over the wraparound means laterally, that is to say in the axial direction of the wraparound gear mechanism, and to subsequently be connected to one another. A sliding rail of this type is known, for example, from DE 10 2013 211 748 A1. It has been determined surprisingly, however, that faulty connections can occur during the assembly of a two-piece sliding rail of this type.

SUMMARY

Proceeding herefrom, it is the object of the present disclosure to at least partially overcome the disadvantages which are known from the prior art. The features according to the disclosure result from the independent claims, with respect to which advantageous embodiments are indicated in the dependent claims. The features of the claims can be combined in any technically appropriate way, it also being possible to this end for the explanations from the following description and features from the figures to be added which comprise supplementary refinements of the disclosure.

The disclosure relates to a sliding rail half for a two-piece sliding rail, the sliding rail being set up to reduce vibrations and undulations for a wraparound means of a wraparound gear mechanism, the sliding rail half having at least the following components:

a first bayonet hook;
a first bayonet mounting;
a first sliding face in a sliding plane;
a first joining face;
a vertical axis which lies perpendicularly on the sliding plane; and
a longitudinal axis which runs in the sliding plane and parallel to the first joining face, the first joining face being set up to bear against a second joining face of a structurally identical second sliding rail half, the structurally identical second sliding rail half being rotated by 180° about the vertical axis relative to the first sliding rail half for joining purposes;

the first bayonet mounting being set up for connecting to a second bayonet hook of a structurally identical second sliding rail half and the first bayonet hook being set up for connecting to a second bayonet mounting of a structurally identical second sliding rail half in such a way that the first joining face is in contact with the corresponding second joining face of the structurally identical second sliding rail half to be joined. The sliding rail half is distinguished, above all, by virtue of the fact that a first pin is arranged in the first bayonet mounting, which first pin, in interaction with a second bayonet hook of the second sliding rail half to be joined, prevents a displacement of the second sliding rail half relative to the first sliding rail half along the longitudinal axis when the first sliding face and the second sliding face are arranged in the sliding plane and the first joining face is in contact at least partially with the corresponding second joining face and the second bayonet hook is not received in the first bayonet mounting.

To begin with, it is to be noted that the designation first and second is utilized in each case solely for allocation to a respective, that is to say first and second, sliding rail half. The designation second bayonet hook, for example, therefore does not require that there is necessarily a first bayonet hook.

The sliding rail half is described above in the description in a manner which proceeds from a first sliding rail half. This serves solely for improved clarity. As the second sliding rail half is structurally identical, at least in relation to the listed features and their spatial arrangement, the second sliding rail half is likewise described hereby; the allocation first is to be replaced in each case by the allocation second and vice versa for an unambiguous determination of the features. In the following text, the designations first and second are therefore dispensed with partially where the text concerns both sliding rail halves equally. The structurally identical configuration necessarily results in an appropriate corresponding arrangement of the respective pairings for connecting the two sliding rail halves comprising a (first or second) bayonet hook and a (second or first) bayonet mounting. Both sliding rail halves can preferably be manufactured by means of a single casting mold or by means of identical CNC machining, for example with the removal of material. As an alternative, however, deviations are possible in relation to features which are not relevant for the orientation with respect to one another and for the connection of the two sliding rail halves.

In one embodiment, the sliding rail has further elements in addition to the sliding rail halves and is not restricted solely to the two main elements, namely the structurally identical sliding rail halves. The two-piece sliding rail is preferably assembled solely from the two structurally identical sliding rail halves and can be fixed sufficiently within itself, and preferably to the wraparound gear mechanism, by way of said sliding rail halves themselves.

In order to reduce vibrations and undulations of a wraparound means, the sliding face bears against the wraparound means with as little play as possible in the installed state of the sliding rail in a wraparound gear mechanism. To this end, the sliding rail, or at least the sliding face, is manufactured from a low-friction material, preferably from a plastic. The sliding rail halves are preferably injection molded parts. Here, the sliding face additionally serves to orient the two sliding rail halves with respect to one another. A lower and an upper sliding face are preferably configured, which can be guided over the wraparound means and are thus oriented in relation to the perpendicular vertical axis on the sliding plane with respect to the wraparound means and with respect to one another. In conjunction with the sliding rail as described here, the sliding plane is optionally considered to be that sliding plane, in which the upper sliding face lies or in which the lower sliding face lies. As an alternative, it is sufficient to not consider the sliding plane to be a mathematical plane, but rather a perpendicular extent between the two sliding faces, it then being necessary, however, for in each case the same consideration to be used for both sliding rail halves. In one embodiment, the sliding faces are divided in each case into a plurality of sections which are detached from one another. At least a part of the sliding faces, preferably in each case the entire sliding face, has a tangential extent between the effective radii of the cone pulley pairs in the installed state in a wraparound gear mechanism. In one embodiment, for example, the sliding face has an inlet section and/or an outlet section which are/is curved and/or inclined in each case in the direction of the vertical axis away from the wraparound means.

The sliding rail halves which are oriented with respect to one another along the vertical axis are then guided toward one another along a connecting direction which lies in the sliding plane and is oriented transversely with respect to the longitudinal axis. The two joining faces can be brought into contact with one another completely, that is to say over their entire extent which is intended for contact, only when the bayonet hooks are introduced into the respectively corresponding bayonet mountings, however. The joining faces are preferably in each case a single contiguous face in a plane which is oriented transversely with respect to the sliding plane and in the direction of extent of the sliding faces, that is to say parallel to the running direction of the wraparound means in the installed state in a wraparound gear mechanism. In other embodiments, the joining faces are configured in multiple pieces, but in each case correspondingly, with the result that the respectively corresponding sections of the joining faces of the first sliding rail half and the second sliding rail half are in contact with one another when the two sliding rail halves have been connected to one another correctly. In one embodiment, the joining faces are divided in each case into a plurality of sections which are detached from one another.

A bayonet hook has a pin section and an abutment section. The pin section is tapered at least partially with respect to the abutment section and has a length which is set up in such a way that a depth of the bayonet mounting can be bridged. The abutment section has at least one flange which is set up in such a way that the abutment section comes into contact with the bayonet mounting and thus connects the two sliding rail halves to one another fixedly. In one preferred embodiment, the corresponding bayonet mounting has a bayonet hook inlet which is at least so large that the abutment section of the bayonet hook can be introduced. The bayonet hook inlet is adjoined laterally by a latching rail which is at least so large that the pin section of the bayonet hook can be received. At the same time, however, the latching rail is smaller than the abutment section, with the result that the bayonet hook can then be moved only in the direction of extent of the latching rail. Here, the latching rail preferably extends parallel to the sliding plane, with the result that the two sliding rail halves can be connected to one another easily in the state, in which they are placed onto the wraparound means. Here, the latching rail has a depth which corresponds with the length of the pin section, with the result that the two sliding rail halves are connected to one another with as far as possible no play, and are preferably braced to one another in the final assembly position.

If no pin is provided, the first bayonet hook and the corresponding second bayonet mounting (first pairing) are guided together correctly in the case of faulty assembly, whereas the second bayonet hook has not yet been introduced into its corresponding first bayonet mounting (second pairing), or vice versa. If the closing movement is then carried out, that is to say the displacement of the first sliding rail half relative to the second sliding rail half along the longitudinal axis, the first pairing is connected correctly in the indicated example, but the second bearing does not establish a connection. Moreover, in the case of many materials, at least one sliding rail half or at least the incorrectly introduced (here, the second) bayonet hook is damaged.

In order to prevent an above-described faulty assembly, a pin is formed in the bayonet mounting. Said pin interacts with the corresponding bayonet hook in such a way that a complete displacement along the longitudinal axis is not possible when another pairing is in (correct) engagement with one another. In the case of an incomplete displacement, the joining faces are not brought into congruence with one another completely, with the result that this can be seen easily by an installer. The displacement is preferably prevented at such an early stage that the pairing which is guided together correctly cannot build up a holding force for connecting the two sliding rail halves. The length of the complete displacement preferably corresponds to the length of the bayonet mounting minus the dimension in the direction of the longitudinal axis of the corresponding bayonet hook.

In one preferred embodiment, the pin has an extent out of the joining face which corresponds to at least one fourth of the length of the extent of the corresponding bayonet hook. Bypassing of the pin is therefore reliably prevented. In one alternative embodiment, bypassing leads to a resulting deformation of a sliding rail half or a bayonet hook, which signals a faulty assembly to the installer.

A pin of this type is preferably configured on each bayonet mounting, in order to avoid a faulty assembly. A sliding rail half preferably has in each case two bayonet hooks and two bayonet mountings, to be precise in each case one pair per sliding face, preferably close to the ends in the longitudinal direction of the joining faces.

In one alternative or supplementary embodiment of the disclosure, a sliding rail half for a two-piece sliding rail is proposed, the sliding rail having at least one sliding face for reducing vibrations and undulations for a wraparound means of a wraparound gear mechanism, the sliding rail half having at least the following components:

a first joining face;

a longitudinal axis which runs parallel to the first joining face, a first bayonet mounting, with a latching rail in the direction of the longitudinal axis, and a bayonet hook inlet, which is connected to the latching rail, for a bayonet hook which is shaped correspondingly for connecting purposes. The sliding rail half is distinguished, above all, by virtue of the fact that at least one first pin is arranged at the transition from the bayonet hook inlet to the latching rail, which first pin has an extent perpendicularly out of the joining face, the extent preferably corresponding in terms of magnitude to at least one fourth of the height of the latching rail along a vertical axis perpendicularly on a sliding face of a sliding rail.

The sliding rail half is a constituent part of a two-piece sliding rail, a second sliding rail half being provided, in order to form the complete sliding rail. Here, the sliding rail halves are not necessarily symmetrical and are therefore not necessarily one mathematical half of the sliding rail. Furthermore, in one embodiment, the sliding rail has further elements in addition to the sliding rail halves. The two-piece sliding rail is preferably assembled solely from the two sliding rail halves and can be fixed sufficiently within itself, and preferably to the wraparound gear mechanism, by way of said sliding rail halves themselves. Here, the sliding rail has at least one sliding face which is set up for bearing against a wraparound means of a wraparound gear mechanism as far as possible without play, in order to reduce vibrations and undulations of a wraparound means. Here, the at least one sliding face is formed by the sliding rail half which is described here and/or by the corresponding sliding rail half.

The sliding rail, or at least the sliding face, is manufactured from a low-friction material, preferably from a plastic, for bearing with as little friction as possible against a wraparound means. The sliding rail halves are preferably injection molded parts. The sliding face preferably additionally serves to orient the two sliding rail halves with respect to one another. In one alternative embodiment, only one sliding rail half has at least one sliding face, and the corresponding sliding rail half can be oriented with respect to the other sliding rail half regardless thereof. A lower and an upper sliding face are preferably configured which can be guided over the wraparound means and are thus oriented with respect to the wraparound means in relation to a perpendicular vertical axis on the sliding plane. In conjunction with the sliding rail as described here, the sliding plane is optionally considered to be that sliding plane, in which the upper sliding face or in which the lower sliding face lies. In the alternative, it is sufficient to not consider the sliding plane to be a mathematical plane, but rather with a perpendicular extent between the two sliding faces, it then being necessary, however, for in each case the same consideration to be used for both sliding rail halves. In one embodiment, the at least one sliding face is divided into a plurality of sections which are detached from one another. At least one part of the sliding face, preferably in each case the entire sliding face, has a tangential extent between the effective radii of the cone pulley pairs in the installed state in a wraparound gear mechanism. In one embodiment, for example, the sliding face has an inlet section and/or an outlet section which are/is curved and/or inclined in each case in the direction of the vertical axis away from the wraparound means.

The sliding rail halves which are oriented with respect to one another are guided toward one another along a connecting direction which is preferably arranged parallel to the sliding plane and is oriented transversely with respect to the longitudinal axis. The two joining faces can be brought into contact with one another completely, that is to say over their entire extent which is intended for contact, only when a bayonet hook is introduced into the first bayonet mounting, however, or, in the case of a plurality of bayonet hooks and corresponding bayonet mountings, all of them have been introduced in each case. The joining face is preferably a single contiguous face in a plane which is oriented transversely with respect to the sliding plane and in the direction of extent of the sliding face, that is to say parallel to the running direction of the wraparound means in the installed state in a wraparound gear mechanism. In other embodiments, the joining face is configured in multiple pieces, with the result that the respectively corresponding sections of the joining faces of the first sliding rail half and the corresponding second sliding rail half are in contact with one another when the two sliding rail halves of a sliding rail have been connected to one another correctly. In one embodiment, the joining face is divided into a plurality of sections which are detached from one another.

The bayonet mounting has a bayonet hook inlet which is at least so large that a corresponding bayonet hook can be introduced. The bayonet hook inlet is adjoined laterally by a latching rail which is at least so large that the completely introduced bayonet hook can be received. At the same time, however, the latching rail is smaller than the bayonet hook inlet, with the result that the bayonet hook which is introduced therein can be moved only in the direction of extent of the latching rail. To this end, a corresponding bayonet hook preferably has a pin section and an abutment section. The pin section is tapered at least partially with respect to the abutment section and has a length which is set up in such a way that a depth of the latching section of the bayonet mounting can be bridged. The abutment section has at least one flange which is set up in such a way that the abutment section comes into contact with the bayonet mounting and thus connects the two sliding rail halves fixedly to one another. Here, the latching rail has a depth which corresponds with the length of the pin section, with the result that the two sliding rail halves are connected to one another as far as possible without play, and are preferably braced to one another in the final assembly position.

If no pin is provided, at least one further connecting pairing is guided together correctly in the case of a faulty assembly, whereas the bayonet mounting has not yet received the corresponding bayonet hook. If the closing movement is then carried out, that is to say the displacement of the corresponding sliding rail halves relative to one another, the further connecting pairing is connected correctly, but the pairing comprising the bayonet mounting and the corresponding bayonet hook does not establish a connection. Moreover, in the case of many materials, at least one sliding rail half or at least the incorrectly introduced bayonet hook is damaged.

In order to prevent an above-described faulty assembly, a pin is formed in the bayonet mounting. Said pin interacts with the corresponding bayonet hook in such a way that a complete displacement is not possible for connecting purposes when a further connecting pairing is in (correct) engagement with one another. In the case of an incomplete displacement, the joining faces are not brought completely into congruence with one another, with the result that this can be recognized easily by the installer. The displacement is preferably prevented at such an early stage that the connecting pairing which is guided together correctly cannot build up a holding force for connecting the two sliding rail halves. The length of the complete displacement preferably corresponds to the length of the bayonet mounting minus the dimension in the direction of the longitudinal axis of the corresponding bayonet hook.

To this end, the pin has an extent out of the joining face which corresponds to at least half the height of the latching section and/or one fourth of the length of extent of the corresponding bayonet hook. Bypassing of the pin is therefore reliably prevented. In one alternative embodiment, bypassing leads to a resulting deformation of a sliding rail half or a bayonet hook, which signals a faulty assembly to the installer.

A pin of this type is preferably configured on each bayonet mounting, in order to avoid a faulty assembly. A sliding rail half preferably has in each case two bayonet hooks and two bayonet mountings, to be precise in each case one pair per sliding face, preferably close to the ends in the longitudinal direction of the joining faces.

In one preferred embodiment, the sliding rail half which is proposed here is constructed in such a way that it can be connected to a sliding rail half which is structurally identical at least in relation to the components which are relevant for aligning and for connecting.

Furthermore, the disclosure relates to a sliding rail for reducing vibrations and undulations for a wraparound means of a wraparound gear mechanism, the sliding rail having at least one sliding face, a first sliding rail half and at least one second sliding rail half, the first sliding rail half having at least the following components:
  a first bayonet mounting;
  a first joining face; and
  a longitudinal axis which runs parallel to the first joining face, and the second sliding rail half having at least the following components:
  a second bayonet hook, and
  a second joining face for bearing against the at least one first joining face;
the second bayonet hook being set up for connecting to the first bayonet mounting in such a way that the first joining face is in contact with the second joining face of the second sliding rail half to be joined. Here, the sliding rail is distinguished, above all, by virtue of the fact that a first pin is arranged in the first bayonet mounting, which first pin, in interaction with the second bayonet hook of the second sliding rail half to be joined, prevents a displacement of the second sliding rail half relative to the first sliding rail half along the longitudinal axis when the first joining face is in contact at least partially with the second joining face for connecting the first sliding rail half to the second sliding rail half and the second bayonet hook is not received in the first bayonet mounting.

The two-piece sliding rail comprises a first sliding rail half and a second sliding rail half. Here, the sliding rail halves are not necessarily symmetrical and are therefore also not necessarily one mathematical half of the sliding rail. In one embodiment, furthermore, the sliding rail has further elements in addition to the sliding rail halves. The two-piece sliding rail is preferably assembled solely from the two sliding rail halves and can be fixed sufficiently within itself, and preferably to the wraparound gear mechanism, by way of said sliding rail halves themselves.

In order to reduce vibrations and undulations of a wraparound means, the at least one sliding face of the sliding rail bears against the wraparound means with as little play as possible in the installed state of the sliding rail in a wraparound gear mechanism. The first sliding rail half and/or the second sliding rail half comprise/comprises the at least one sliding face. To this end, the sliding rail, and/or at least the sliding face or faces, is manufactured from a low-friction material, preferably from a plastic. The sliding rail halves are preferably injection molded parts. A lower and an upper sliding face are preferably configured which can be guided over the wraparound means and are thus oriented with respect to the wraparound means and with respect to one another in relation to the perpendicular axis on the sliding plane. In conjunction with the sliding rail as described here, the sliding plane is optionally considered to be that plane, in which the upper sliding face or in which the lower sliding face lies. In the alternative, it is sufficient to not consider the sliding plane to be a mathematical plane, but rather with a perpendicular extent between the two sliding faces, it then being necessary, however, for in each case the same consideration to be used for both sliding rail halves. In one embodiment, the sliding faces are divided in each case into a plurality of sections which are detached from one another. At least one part of the sliding faces, preferably in each case the entire sliding face, has a tangential extent between the effective radii of the cone pulley pairs in the installed state in a wraparound gear mechanism. In one embodiment, for example, the sliding face has an inlet section and/or an outlet section which are/is curved and/or inclined in each case in the direction of the vertical axis away from the wraparound means. Both sliding rail halves preferably have in each case at least one sliding face, which sliding faces additionally serve here for orienting the two sliding rail halves with respect to one another during the assembly.

The sliding rail halves which are oriented with respect to one another are guided toward one another along a connecting direction which is preferably arranged parallel to the sliding plane and is oriented transversely with respect to the longitudinal axis. The two joining faces can be brought into contact with one another completely, that is to say over their entire extent which is intended for contact, only when the second bayonet hook is introduced into the first bayonet mounting, however, or, in the case of a plurality of bayonet hooks and corresponding bayonet mountings, all of them are in each case introduced. The joining faces are in each case preferably a single contiguous face in a plane which is oriented transversely with respect to the sliding plane and in the direction of extent of the sliding face, that is to say parallel to the running direction of the wraparound means in the installed state in a wraparound gear mechanism. In other embodiments, the joining face is configured in multiple pieces, with the result that the respectively corresponding sections of the joining faces of the first sliding rail half and the corresponding second sliding rail half are in contact with one another when the two sliding rail halves of a sliding rail have been connected to one another correctly. In one embodiment, the joining face is divided into a plurality of sections which are detached from one another.

In one preferred embodiment, the first bayonet mounting has a bayonet hook inlet which is at least so large that the second bayonet hook can be introduced. The bayonet hook inlet is adjoined laterally by a latching rail which is at least so large that the completely introduced second bayonet hook can be received. At the same time, however, the latching rail is smaller than the bayonet hook inlet, with the result that the second bayonet hook which is introduced therein can be moved only in the direction of extent of the latching rail. To this end, the second bayonet hook preferably has a pin section and an abutment section. The pin section is tapered at least partially with respect to the abutment section and has a length which is set up in such a way that a depth of the latching section of the bayonet mounting can be bridged. The abutment section has at least one flange which is set up in such a way that the abutment section comes into contact with the bayonet mounting and thus connects the two sliding rail halves fixedly to one another. Here, the latching rail has a depth which corresponds with the length of the pin section, with the result that the two sliding rail halves are connected to one another as far as possible without play, and are preferably braced to one another in the final assembly position.

If no pin is provided, at least one further connecting pairing is guided together correctly in the case of a faulty assembly, whereas the first bayonet mounting has not yet received the second bayonet hook. If the closing movement is then carried out, that is to say the displacement of the two sliding rail halves relative to one another, the further connecting pairing is connected correctly, but the pairing comprising the first bayonet mounting and the second bayonet hook does not establish a connection. Moreover, in the case of many materials, at least one sliding rail half or at least the incorrectly introduced bayonet hook is damaged.

In order to prevent an above-described faulty assembly, a pin is formed in the bayonet mounting. Said pin interacts with the corresponding bayonet hook in such a way that a complete displacement for connecting purposes is not possible when a further connecting pairing is in (correct) engagement with one another. In the case of an incomplete displacement, the joining faces are not brought into congruence with one another completely, with the result that this can be recognized easily by an installer. The displacement is preferably prevented at such an early stage that the connecting pairing which is assembled correctly cannot build up a holding force for connecting the two sliding rail halves. The length of the complete displacement preferably corresponds to the length of the bayonet mounting minus the dimension in the direction of the longitudinal axis of the corresponding bayonet hook.

To this end, the pin has an extent out of the joining face which corresponds to at least one fourth of the length of the extent of the first or second bayonet hook. Bypassing of the pin is therefore prevented reliably. In one alternative embodiment, bypassing leads to a resulting deformation of a sliding rail half or a bayonet hook, which signals a faulty assembly to the installer.

A plurality of bayonet mountings and corresponding bayonet hooks are preferably configured, a pin of this type preferably being configured on each bayonet mounting, in order to avoid a faulty assembly. A sliding rail half preferably has in each case two bayonet hooks and two bayonet mountings, to be precise in each case one pair per sliding face, preferably close to the ends in the longitudinal direction of the joining faces.

According to one advantageous embodiment of the sliding rail, the first sliding rail half and the second sliding rail half are configured in accordance with the above-described second embodiment and/or are of structurally identical configuration in accordance with the above-described first embodiment.

The variant in accordance with the second embodiment results in high flexibility of the connection and does not necessarily require double orientation on the wraparound means and the joining faces for a correct assembly. A structurally identical embodiment of the sliding rail halves is preferred because considerable manufacturing costs can be saved as a result, in particular for mass production.

According to one advantageous embodiment of the sliding rail, the first sliding rail half has an upper first joining face and a lower first joining face and preferably an upper first sliding face and a lower first sliding face, and the second sliding rail half has an upper second joining face and a lower second joining face and preferably an upper second sliding face and a lower second sliding face, the first joining faces having in each case at least one first bayonet mounting and preferably in each case at least one first bayonet hook, and the second joining faces having in each case at least one second bayonet hook and preferably in each case at least one second bayonet mounting, the at least one second bayonet mounting being of corresponding configuration with in each case the at least one first bayonet hook for connecting purposes.

In said embodiment, a particularly satisfactory property for reducing vibrations and undulations in the wraparound means of a wraparound gear mechanism is achieved, by the sliding faces bearing as far as possible without play at the top and bottom, that is to say in the amplitude direction of the possible vibrations and undulations of a wraparound means. A high stability of the sliding faces is achieved via in each case at least one pairing comprising a bayonet hook and a bayonet mounting. To this end, in each case one pairing of this type is preferably arranged at an end in the running direction of the wraparound means.

According to one advantageous embodiment of the sliding rail, at least the second sliding rail half is a cast component, and it being possible for the first pin of the first sliding rail half to be received in a second pin receptacle of the second sliding rail half when the first joining face and the second joining face are in contact with one another completely, the second pin receptacle being formed at least partially by way of a second demolding opening for the second bayonet hook. In said advantageous embodiment, the circumstance of the manufacture of a cast part is utilized that a demolding opening has to be provided in the bayonet hook for some casting molds for producing a bayonet hook, in order to avoid an undercut which cannot be demolded. Said demolding opening is provided, in particular, in the sliding rail halves which are used currently. In order to recess the pin during the connection of the two sliding rail halves, a demolding opening of this type is particularly suitable. Said demolding opening merely has to be widened laterally under some circumstances, in order for it to be possible to already receive the pin before the displacement for connecting the two sliding rail halves. Here, the pin is preferably configured in accordance with the dimensions of the corresponding demolding opening.

According to one advantageous refinement of the sliding rail, a plurality of pins are configured which are arranged in each case in a bayonet mounting.

A pin according to the above description is particularly preferably arranged on each bayonet mounting. In this way, all possible faulty assembly operations are prevented or at least made more difficult, and/or the installer is alerted to said possible faulty assembly operations. In another variant, pins of this type are arranged only at the pairing, at which a faulty assembly frequently occurs according to experience.

According to a further aspect of the disclosure, a wraparound gear mechanism for a drive train is proposed, which wraparound gear mechanism has at least the following components:
  at least one transmission input shaft with a first cone pulley pair;
  at least one transmission output shaft with a second cone pulley pair;
  at least one wraparound means which connects the first cone pulley pair to the second cone pulley pair in a torque-transmitting manner;
  at least one sliding rail in accordance with one embodiment according to the above description for reducing vibrations and undulations of the at least one wraparound means.

A torque can be transmitted by way of the wraparound gear mechanism proposed here in a manner which is stepped up or stepped down, it being possible for the transmission to be set in an infinitely variable manner at least within ranges. Here, the step-up transmission ratio is set via the two cone pulley pairs as described above. Here, the wraparound means is arranged between the cone pulley pairs which can be moved in each case relative to one another, and transmit a torque from one cone pulley pair to the other cone pulley pair. Here, the wraparound means is preferably kept at a constant length. Here, the at least one sliding rail is always oriented in a bearing manner parallel to the wraparound means. The assembly of the at least one sliding rail in the wraparound gear mechanism is considerably simplified and less susceptible to faults.

According to a further aspect of the disclosure, a drive train is proposed having a drive unit with an output shaft, at least one consumer and a wraparound gear mechanism according to the above description, it being possible for the output shaft to be connected with a variable step-up transmission ratio to the at least one consumer by means of the wraparound gear mechanism for the transmission of torque.

The drive train is set up to transmit a torque which is provided by a drive unit, for example an energy conversion machine, and is output via its output shaft, for example of an internal combustion engine or an electric motor, as required for utilization, that is to say with consideration of the required rotational speed and the required torque. The utilization is, for example, at least one drive wheel of a motor vehicle and/or an electric generator for providing electric energy. In order to transmit the torque in a targeted manner and/or by means of a manual transmission with different step-up transmission ratios, the use of the above-described wraparound gear mechanism is particularly advantageous because a large step-up transmission ratio spread can be achieved in a small space. Conversely, an absorption of inertial energy which is introduced, for example, by a drive wheel and then forms a drive unit can be transmitted by means of the wraparound gear mechanism to an electric generator for recuperation, that is to say electric storage of the braking energy, by way of a torque transmission path which is set up correspondingly. In one preferred embodiment, furthermore, a plurality of drive units are provided which can be operated such that they are connected in series or in parallel or are decoupled from one another, and the torque of which can be provided for utilization in each case as required by means of a wraparound gear mechanism in accordance with the above description. Examples are hybrid drives comprising an electric motor and an internal combustion engine, or else multiple cylinder engines, in which individual cylinders (or cylinder groups) can be switched in. The wraparound gear mechanism allows a reliable and inexpensive implementation of the stated advantages, in particular by it being possible for the at least one sliding rail which is used to be assembled reliably and only without faults. A failure as a consequence of a faulty assembly of the at least one sliding rail is therefore ruled out.

According to a further aspect of the disclosure, a motor vehicle is proposed which has at least one drive wheel which can be driven by means of a drive train in accordance with the above description.

Most motor vehicles nowadays have front-engine drive and partially position the drive unit, for example an internal combustion engine or an electric motor, in front of the driver's cab and along the main driving direction. The radial installation space is particularly low precisely in the case of an arrangement of this type, and it is therefore particularly advantageous to use wraparound gear mechanisms of small overall design. The use of a wraparound gear mechanism in motorized bicycles is designed similarly, for which considerably increased performance with an unchanged installation space is required. At the same time, the reliability of systems of this type must be kept constant or even increased because the acceptance for maintenance is lower among users.

This problem is exacerbated in the case of passenger motor vehicles of the small car category in accordance with European classification. The power units which are used in a passenger motor vehicle of the small car category are not substantially smaller than in the passenger motor vehicles of larger car categories. Nevertheless, the available installation space is substantially smaller in the case of small cars. The above-described drive train has a wraparound gear mechanism which satisfies the installation space requirements and at the same time makes low-wear reduction of vibrations and undulations of the wraparound means possible on account of a sliding rail which is assembled without faults.

Passenger motor vehicles are assigned to a vehicle class in accordance with, for example, the size, price, weight and performance, said definition being subject to continuous change in accordance with the requirements of the market. In the US market, vehicles of the small car and very small car category in accordance with European classification are assigned to the category of the subcompact car, and, in the British market, they correspond to the supermini category or the city car category. Examples of the very small car category are a Volkswagen up! or a Renault Twingo. Examples of the small car category are an Alfa Romeo Mito, Volkswagen Polo, Ford Fiesta or Renault Clio.

BRIEF DESCRIPTION OF THE DRAWINGS

The above-described disclosure will be described in detail in the following text against the relevant technical background, with reference to the associated drawings which show preferred embodiments. The disclsoure is not restricted in any way by the purely diagrammatic drawings; it is to be noted that the drawings are not to scale and are not suitable for the definition of proportions. In the drawings.

DETAILED DESCRIPTION

A single embodiment of a sliding rail, in which two identical sliding rail halves are used, is shown in the selected illustrations of the disclosure solely for improved clarity.

Figure 1:
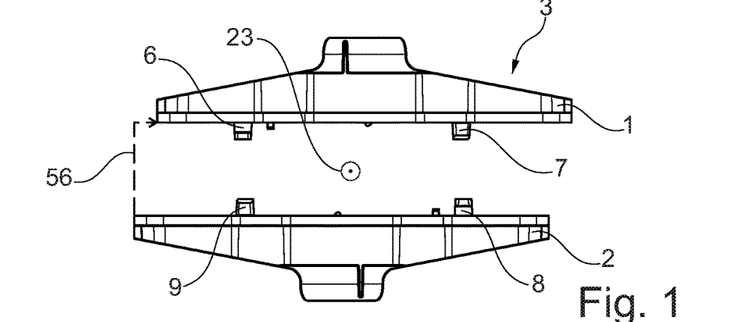
FIG. 1 shows a sliding rail with two sliding rail halves without pins.

FIG. 1 shows a sliding rail 3, in which a first sliding rail half 1 and a second sliding rail half 2 are used which are structurally identical. Said sliding rail halves 1 and 2 are arranged rotated by 180° about a vertical axis 23 with respect to one another so as to lie opposite one another, and are oriented with respect to one another for connecting in a common plane, for example the sliding plane 22 (not shown here, cf. FIG. 5), the plane of the drawing here. If, for example, the second sliding rail half 2 is then guided onto the first sliding rail half 1 along the connecting movement 56, the two sliding rail halves 1 and 2 can be connected fixedly to one another by means of the bayonet hooks 6, 7, 8 and 9 and the corresponding bayonet mountings 10, 11, 12 and 13 (concealed here, cf. FIG. 5).

Figure 2:
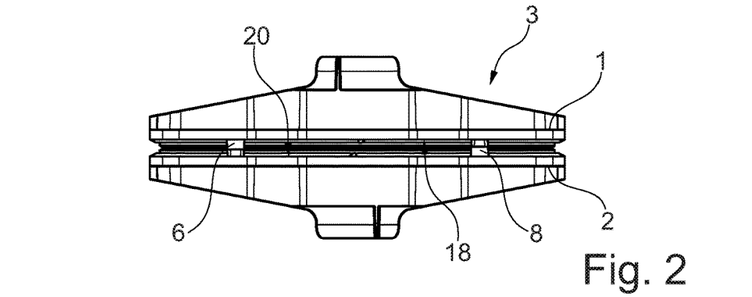
FIG. 2 shows a first variant of a faulty assembly of a sliding rail.
Figure 3:
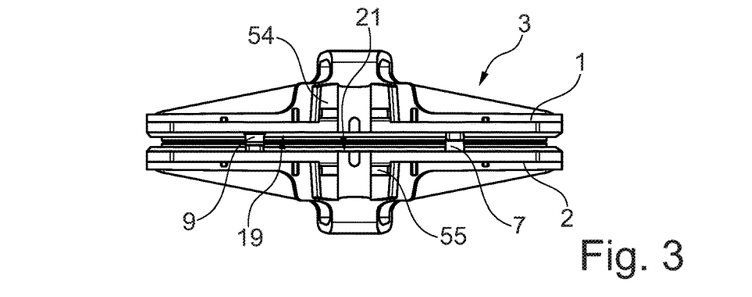
FIG. 3 shows a second variant of a faulty assembly of a sliding rail.
Figure 4:
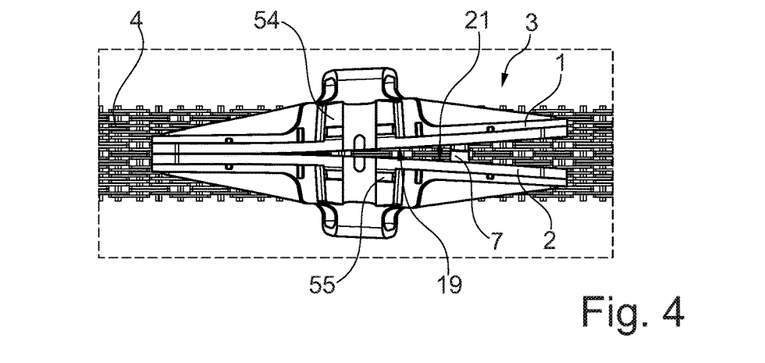
FIG. 4 shows a third variant of a faulty assembly of a sliding rail.

FIG. 2 to FIG. 4 show three possible versions of a faulty assembly of said arrangement of the sliding rail 3 which is shown in FIG. 1.

Figure 12:
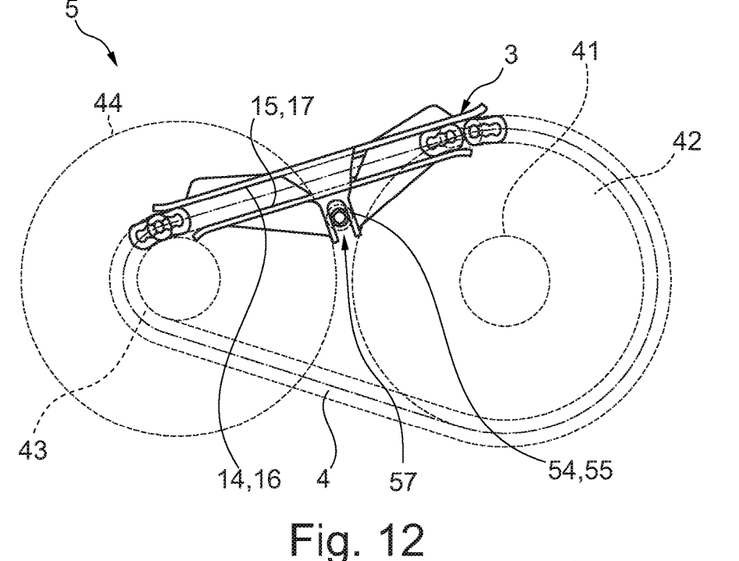
FIG. 12 shows a wraparound gear mechanism with a sliding rail.

FIG. 2 shows a version in plan view from above, that is to say from outside the ring which is formed by a wraparound means 4 (cf. FIG. 12). Here, the two upper bayonet hooks, namely the upper first bayonet hooks 6 of the first sliding rail half 1 and the upper second bayonet hook 8 of the second sliding rail half 2, are not connected correctly, whereas the lower bayonet hooks, namely the lower first bayonet hook 7 and the lower second bayonet hook 9 (both concealed), are connected correctly as considered on their own. Here, the upper first joining face 18 and the upper second joining face 20 do not come into contact with one another at all.

FIG. 3 shows a version in a plan view from below, that is to say from within the ring which is formed by a wraparound means 4 (cf. FIG. 12). Here, the first bearing seat 54 of the first sliding rail half 1 and the second bearing seat 55 of the second sliding rail half 2 can additionally be seen, by means of which the sliding rail 3 can be mounted such that it can be tilted depending on the step-up transmission ratio which is set in the correctly mounted state in a manner which is adapted to the position of the wraparound means 4 (cf. FIG. 12). Here, the two lower bayonet hooks, namely the lower first bayonet hook 7 of the first sliding rail half 1 and the lower second bayonet hook 9 of the second sliding rail half 2, are not correctly connected, whereas the upper bayonet hooks, namely the upper first bayonet hook 6 and the upper second bayonet hook 8 (both concealed), are connected correctly as considered on their own. Here, the lower first joining face 19 and the lower second joining face 21 do not come into contact with one another at all.

FIG. 4 shows a version in the plan view from below as in FIG. 3, the wraparound means 4 being additionally shown here which is enclosed by the two sliding rail halves 1 and 2. Here, the lower first bayonet hook 7 of the first sliding rail half 1 and possibly also the upper second bayonet hook 8 of the second sliding rail half 2 (concealed here by the wraparound means 4) are not connected correctly, whereas the other bayonet hooks, for example the lower second bayonet hook 9, are connected correctly as considered on their own. Here, at least the lower first joining face 19 and possibly the lower second joining face 21 do not come into contact with one another over the entire extent which is provided for contact. This version is fundamentally also possible in the reverse order, but it has been shown that the reverse version can be realized only with difficulty.

Figure 5:
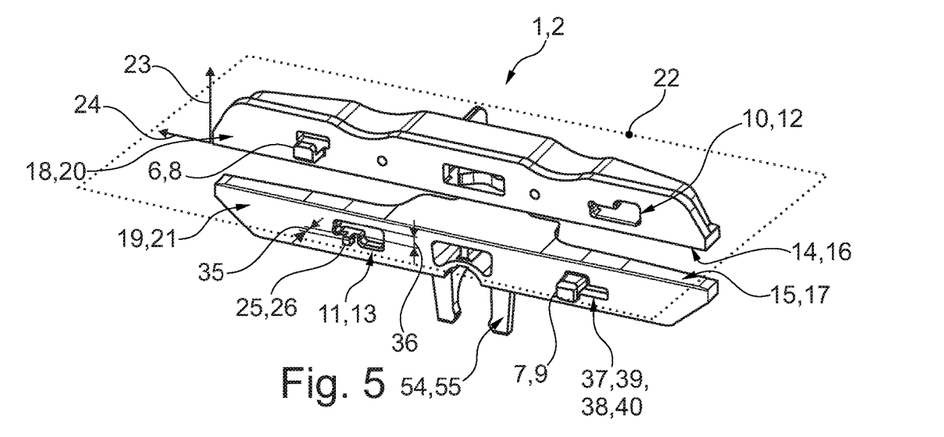
FIG. 5 shows a sliding rail half according to the disclosure in a three-dimensional view.
Figure 6:
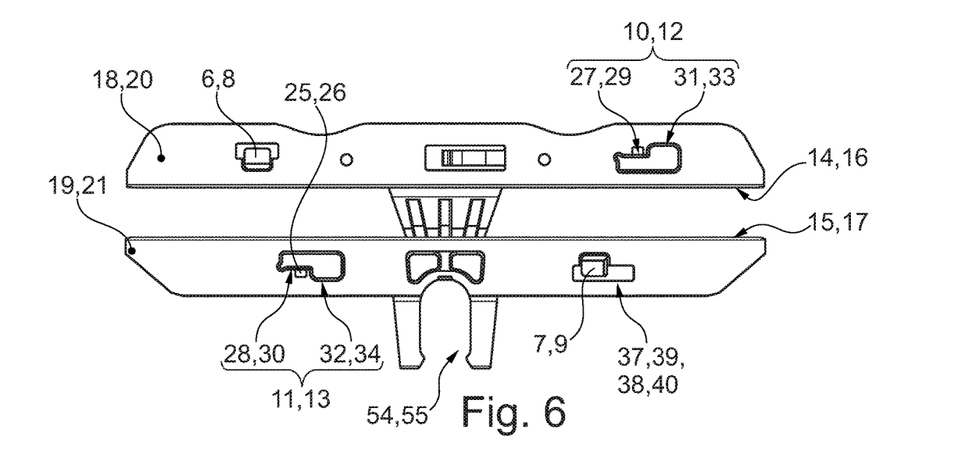
FIG. 6 shows a sliding rail half according to the disclosure in a lateral plan view.

FIG. 5 and FIG. 6 show an embodiment according to the disclosure of a sliding rail half 1 or 2 for a sliding rail 3 (cf. FIG. 1) in a completely identical configuration. One of the sliding rail halves as shown in FIG. 1 is rotated by 180° about the vertical axis 23 in order to connect two structurally identical sliding rail halves 1 and 2 of this type. The vertical axis 23 is oriented normally, that is to say perpendicularly, with respect to the (imaginary) sliding plane 22, the sliding plane 22 being outlined mathematically here and lying in the plane of the upper first or second sliding face 14 or 16, respectively. The longitudinal axis 24 therefore also lies in said sliding plane 22. In this embodiment, an upper first or second sliding face 14 or 16, respectively, and a lower first or second sliding face 15 or 17, respectively, are provided. Accordingly, an upper first or second joining face 18 or 20, respectively, adjoins the upper sliding face 14 or 16 (at least indirectly), via a 90° corner here, and a lower first or second joining face 19 or 21, respectively, likewise adjoins the lower sliding face 15 or 17. In this structurally identical embodiment, the joining faces 18 to 21 have in each case one bayonet hook 6 to 9 and in each case one bayonet mounting 10 to 13. For example, the upper first bayonet hook 6 of the first sliding rail half 1 can be introduced for connecting purposes into the upper second bayonet mounting 12 of the second sliding rail half 2 which has been rotated by 180°. For connecting purposes, the bayonet mountings 10 to 13 have in each case one bayonet hook inlet 31 to 34 which is set up in terms of its dimensions for the introduction of a corresponding bayonet hook 6 to 9. In each case one latching rail 27 or 30 is arranged laterally thereof. An abutment section of the bayonet hook 6 to 9 can be guided behind said latching rails 27 to 30 with reduced dimensions which results in an L-shape here, whereas a pin section of the bayonet hook 6 to 9 lies in the constricted passage of the latching rail 27 to 30. As a result, the first sliding rail half 1 and the second sliding rail half 2 can be connected fixedly to one another. In this example, the bayonet hook 6 to 9 in each case likewise forms an L-shape (which corresponds to the L-shaped bayonet mounting 10 to 13). The first pin 25 or second pin 26 which is formed here only in the lower first or second bayonet mounting 11 or 13, respectively, prevents a displacement of the first sliding rail half 1 relative to the second sliding rail half 2 at least when one of the upper bayonet hooks 6 and 8 is positioned correctly in the corresponding upper bayonet mounting 12 or 10, respectively. Here, the pin 25 or 26 can be introduced into a slightly widened first removal opening 39 for demolding the lower first bayonet hook 7 or into a slightly widened second removal opening 40 for demolding the lower second bayonet hook 9, which thus forms a first pin receptacle 37 or a second pin receptacle 38. In this embodiment, the pin 25, 26 in each case has an extent 35 in terms of magnitude of approximately two thirds of the height 36 in terms of magnitude of the associated bayonet mounting 11 or 13.

Figure 7:
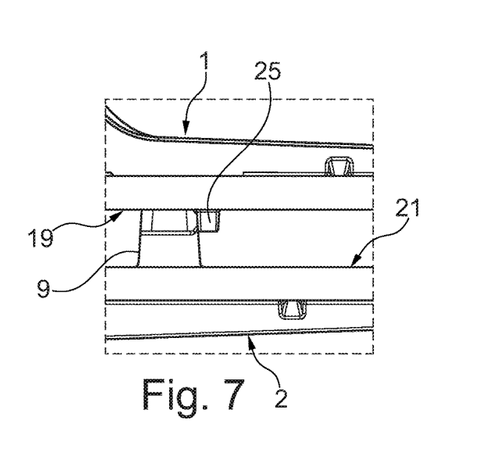
FIG. 7 shows a detail of two sliding rail halves with pins and bayonet hooks in a plan view from below.
Figure 8:
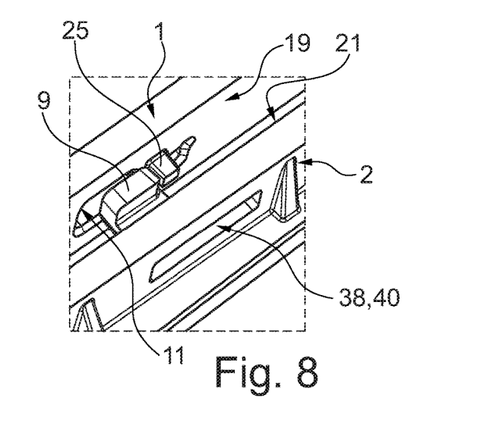
FIG. 8 shows a detail of two sliding rail halves with pins and bayonet hooks in a three-dimensional view from below.

FIG. 7 and FIG. 8 show different perspectives of the operating principle of the first pin 25, as shown in FIG. 5 and in FIG. 6. If the lower second bayonet hook 9 is not introduced correctly into the corresponding lower first bayonet mounting 11, a displacement along the longitudinal axis 24 (cf. FIG. 5) is prevented as a consequence of the lower second bayonet hook 9 bearing against the first pin 25. A faulty assembly is prevented in this way.

Figure 9:
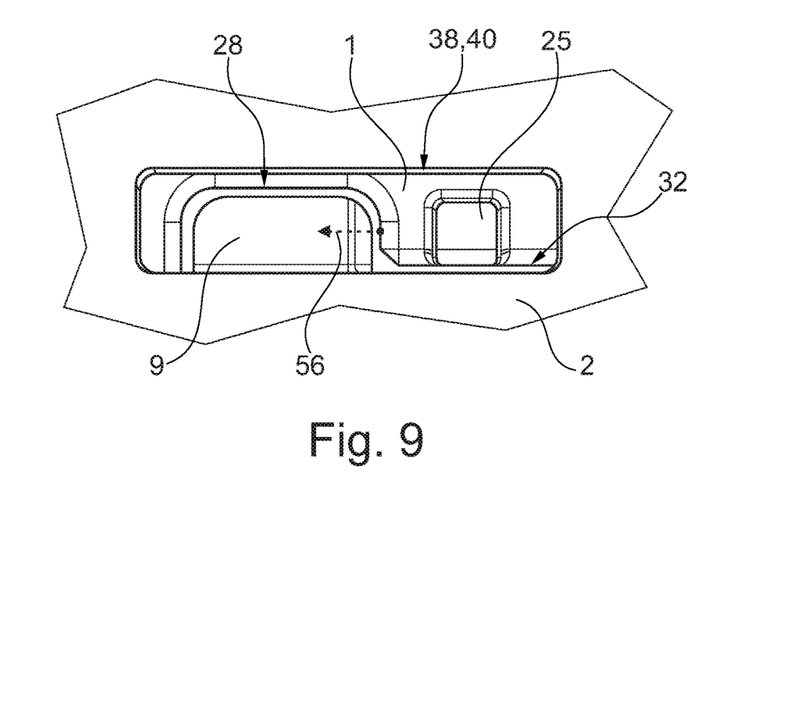
FIG. 9 shows a detail of two sliding rail halves with pins and bayonet hooks in a lateral plan view before correct assembly.
Figure 10:
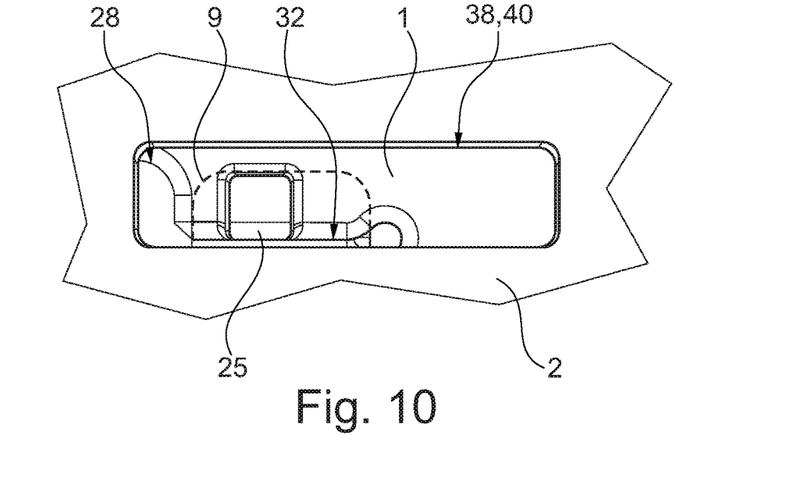
FIG. 10 shows a detail of two sliding rail halves with pins and bayonet hooks in a lateral plan view in a correctly assembled state.

FIG. 9 and FIG. 10 shows a correct assembly of the lower second bayonet hook 9 in the corresponding lower first bayonet mounting 11 and the arrangement of the first pin 25 in the second pin receptacle 38 which is formed by the second demolding opening 40, in a lateral plan view from the second sliding rail half 2.

In FIG. 9, the lower second bayonet hook 9 lies in the lower first bayonet hook inlet 32, and the first pin 25 in the lower first bayonet mounting 11 lies in a widened portion (to the right in the illustration) of the second demolding opening 40 which thus forms the second pin receptacle 38. The relative connecting movement 56 is then to be carried out in order to connect the first sliding rail half 1 fixedly to the second sliding rail half 2.

FIG. 10 shows the illustration of FIG. 9, the relative connecting movement 56 having been carried out here as shown in FIG. 9. The lower second bayonet hook 9 is displaced into the lower first latching rail 32 and is therefore arranged partially behind the bayonet mounting 11. This is indicated here by the concealed edge (dashed line). The first pin 25 has moved behind the lower first bayonet hook 9 and is seated there in the second demolding opening 40 or the second pin receptacle 38 of the second sliding rail half 2.

Figure 11:
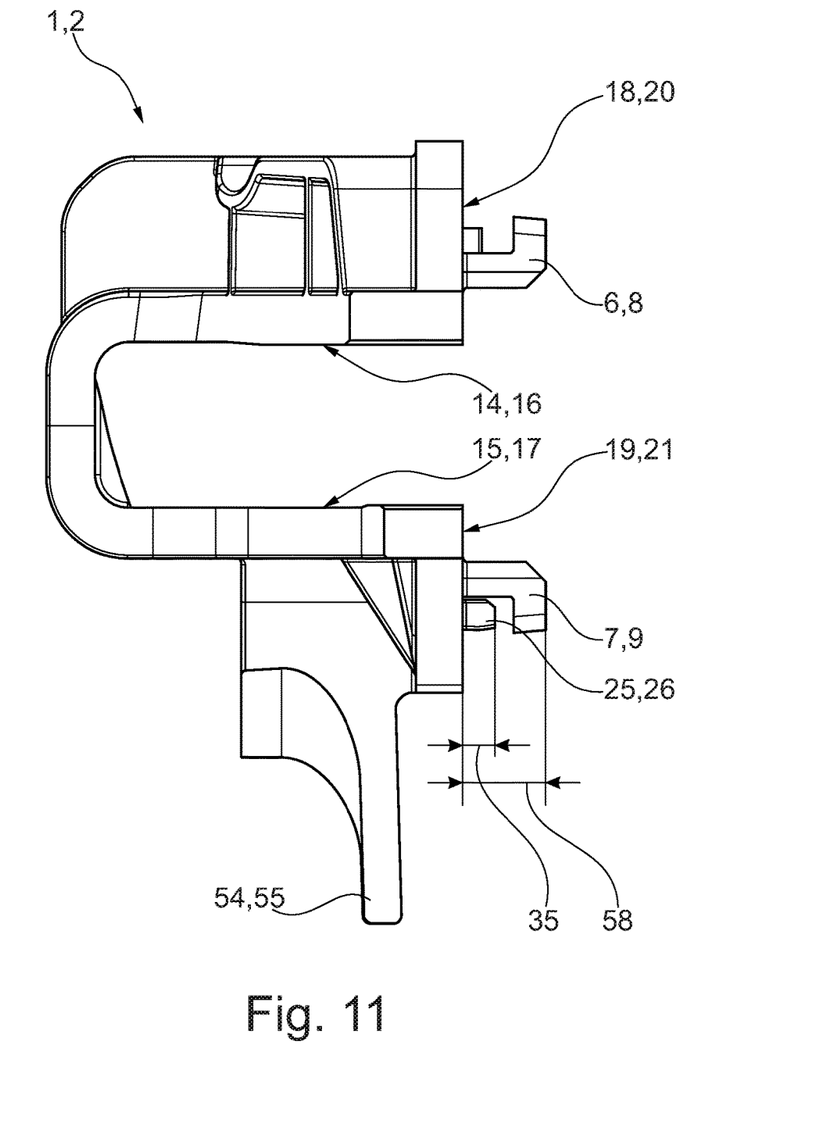
FIG. 11 shows a sliding rail half in a view in the running direction of a wraparound means.

FIG. 11 shows a sliding rail half 1, 2 in the longitudinal direction perpendicularly on the plane of the drawing, as shown, for example, in FIG. 5 and FIG. 6. Here, a first or second pin 25, 26 can be seen in comparison with a lower first or second bayonet hook 7, 9. Here, the extent 35 of the pin 25, 26 corresponds approximately to one third of the length of extent 58 of the corresponding bayonet hook 7, 9. In this way, a faulty connection of a first sliding rail half 1 to a second sliding rail half 2 is prevented reliably.

FIG. 12 shows, by way of example, an outline sketch of a wraparound gear mechanism 5, in which a first cone pulley pair 42 and a second cone pulley pair 44 are provided which are connected fixedly to the transmission input shaft 41 and to the transmission output shaft 43, respectively, so as to rotate with them. The step-up transmission ratio between the transmission input shaft 41 and the transmission output shaft 43 is changed by way of a change in the spacing of the cone pulley pairs 42, 44. To this end, a wraparound means 4 is provided which is configured here as a chain. Here, the vibration and undulation of the wraparound means 4 is limited by means of a tightly bearing sliding rail 3. To this end, the sliding rail 3 has an upper first sliding face 14 and preferably an upper second sliding face 16 as well as a lower first sliding face 15, and preferably a lower second sliding face 17. The sliding rail 3 is mounted such that it can be tilted on a sliding rail bearing 57 by means of its bearing seats 54 and 55, for adaptation of the orientation of the sliding rail 3 to the step-up transmission ratio between the transmission input shaft 41 and the transmission output shaft 43 and/or the wraparound radius on the first cone pulley pair 42 and on the second cone pulley pair 44.

Figure 13:
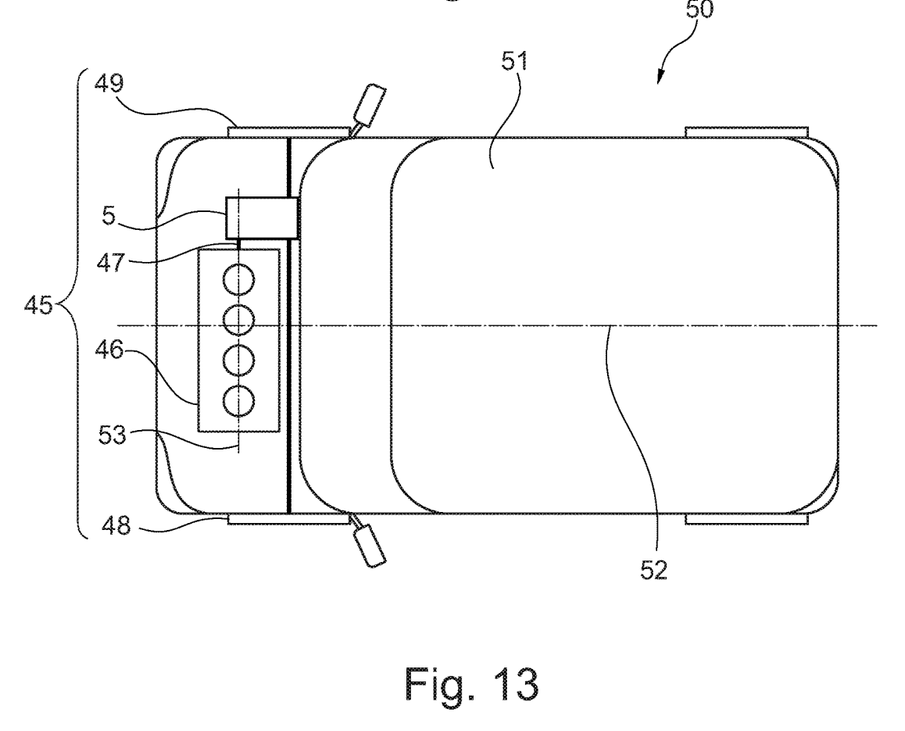
FIG. 13 shows a drive train in a motor vehicle.

FIG. 13 diagrammatically shows a drive train 45, comprising a drive unit 46, shown here as an internal combustion engine, an output shaft 47, a wraparound gear mechanism 5 and a left-hand drive wheel 48 and a right-hand drive wheel 49 which are connected in a torque-transmitting manner. The drive train 45 is arranged here in a motor vehicle 50, the drive unit 46 being arranged in front of the driver's cab 51 with its engine axis 53 transversely with respect to the longitudinal axis 52.

A fault-free assembly of a two-piece sliding rail is possible by way of the sliding rail half which is proposed here.

LIST OF REFERENCE CHARACTERS

1 First sliding rail half
2 Second sliding rail half
3 Two-piece sliding rail
4 Wraparound means
5 Wraparound gear mechanism
6 Upper first bayonet hook
7 Lower first bayonet hook
8 Upper second bayonet hook
9 Lower second bayonet hook
10 Upper first bayonet mounting
11 Lower first bayonet mounting
12 Upper second bayonet mounting
13 Lower second bayonet mounting 14 Upper first sliding face
5 Lower first sliding face
16 Upper second sliding face
17 Lower second sliding face
18 Upper first joining face
19 Lower first joining face
20 Upper second joining face
21 Lower second joining face
22 Sliding plane
23 Vertical axis
24 Longitudinal axis
25 First pin
26 Second pin
27 Upper first latching rail
28 Lower first latching rail
29 Upper second latching rail
30 Lower second latching rail
31 Upper first bayonet hook inlet
32 Lower first bayonet hook inlet
33 Upper second bayonet hook inlet
34 Lower second bayonet hook inlet
35 Extent
36 Height
37 First pin receptacle
38 Second pin receptacle
39 First demolding opening
40 Second demolding opening
41 Transmission input shaft
42 First cone pulley pair
43 Transmission output shaft
44 Second cone pulley pair
45 Drive train
46 Drive unit
47 Output shaft
48 Left-hand drive wheel
49 Right-hand drive wheel
50 Motor vehicle
51 Driver's cab
52 Longitudinal axis
53 Engine axis
54 First bearing seat
55 Second bearing seat
56 Connecting movement
57 Sliding rail bearing
58 Length of extent

The invention claimed is:

1. A sliding rail half for a two-piece sliding rail, the sliding rail being set up to reduce vibrations and undulations for a chain of a wraparound gear mechanism, the sliding rail half comprising:
a first hook;
a first mounting;
a first sliding face in a sliding plane;
a first joining face;
a vertical axis which lies perpendicularly on the sliding plane; and
a longitudinal axis which lies in the sliding plane and is parallel to the first joining face,
the first joining face arranged to bear against a second joining face of a structurally identical second sliding rail half, the structurally identical second sliding rail half being rotated by 180° about the vertical axis relative to the sliding rail half for joining purposes,
wherein the first mounting is configured for connecting to a second hook of the structurally identical second sliding rail half and the first hook is configured for connecting to a second mounting, of the structurally identical second sliding rail half in such a way that the first joining face is in contact with the second joining face of the structurally identical second sliding rail half, wherein a first pin is arranged in the first mounting to prevent a displacement of the structurally identical second sliding rail half relative to the sliding rail half along the longitudinal axis when the first joining face is in contact with the second joining face and the second hook is not received in the first mounting.

2. The sliding rail half of claim 1 wherein the first joining face adjoins the first sliding face via a 90° corner.

3. The sliding rail half of claim 1 wherein the first hook includes a pin section protruding outwardly from the first joining face and an abutment section extending from a distal end of the pin section in a direction perpendicular to the sliding plane for fixedly connecting the first hook to the second mounting of the structurally identical second sliding rail half.

4. The sliding rail half of claim 3 wherein the first mounting includes:
a first hook inlet sized to receive the first hook; and
a latching rail adjoined laterally to the first hook inlet and extending in a longitudinal direction, the latching rail forming a constricted passage, wherein the abutment section of the first hook is adapted to be introduced into the first hook inlet and guided behind the latching rail such that the pin section of the first hook lies in the constricted passage of the latching rail.

5. The sliding rail half of claim 4 wherein a first height of the constricted passage formed by the latching rail is smaller than a second height of the first hook inlet such that the first hook can only be moved in a direction of the latching rail after being received in the first hook inlet.

6. The sliding rail half of claim 4 wherein the latching rail has a depth that corresponds with a length of the pin section of the first hook.

7. The sliding rail half of claim 1 wherein the first hook is formed in an L-shape.

8. A sliding rail half for a two-piece sliding rail, the sliding rail having at least one sliding face for reducing vibrations and undulations for a chain of a wraparound gear mechanism, the sliding rail half comprising:
a first joining face;
a longitudinal axis which runs parallel to the first joining face; and
a first mounting, with a latching rail in a direction of the longitudinal axis, and a hook inlet, which is connected to the latching rail, for a hook which is shaped correspondingly for connecting purposes, wherein at least one first pin is arranged at a transition from the hook inlet to the latching rail, wherein the at least one first pin has an extent protruding perpendicularly out of the first joining face, the extent corresponding in terms of magnitude to at least one fourth of a height of the latching rail along a vertical axis perpendicularly on the at least one sliding face.

9. The sliding rail half of claim 8 wherein the at least one sliding face is made from a low-friction material.

10. The sliding rail half of claim 9 wherein the low-friction material is plastic.

11. The sliding rail half of claim 8 wherein the extent corresponds in terms of magnitude to at least half the height of the latching rail.

12. A sliding rail for reducing vibrations and undulations for a chain of a wraparound gear mechanism, the sliding rail comprising:
at least one sliding face;
a first sliding rail half, the first sliding rail half including:

a first hook;
a first mounting;
a first joining face; and
a longitudinal axis which runs parallel to the first joining face; and
a second sliding rail half, the second sliding rail half including:
a second hook; and
a second joining face arranged for bearing against the first joining face, the second hook configured for connecting to the first mounting in such a way that the first joining face is in contact with the second joining face of the second sliding rail half, wherein a first pin is arranged in the first mounting, to prevent a displacement of the second sliding rail half relative to the first sliding rail half along the longitudinal axis when the first joining face is in contact at least partially with the second joining face for connecting the first sliding rail half to the second sliding rail half and the second hook is not received in the first mounting.

13. The sliding rail of claim 12, wherein the first sliding rail half includes:
an upper first joining face;
a lower first joining face;
an upper first sliding face; and
a lower first sliding face;
wherein the second sliding rail half includes:
an upper second joining face;
a lower second joining face;
an upper second sliding face; and
a lower second sliding face, the first joining faces each having at least one first mounting and at least one first hook, and the second joining faces each having at least one second hook and at least one second mounting, the at least one second mounting being configured so as to correspond with the at least one first hook for connecting purposes.

14. The sliding rail of claim 12, wherein the second sliding rail half is a cast component, and the first pin of the first sliding rail half is configured to be received in a pin receptacle of the second sliding rail half when the first joining face and the second joining face are completely in contact with one another, the pin receptacle being formed at least partially by way of a demolding opening for the second hook.

15. A wraparound gear mechanism for a drive train comprising the sliding rail of claim 12 and including:
at least one transmission input shaft with a first cone pulley pair;
at least one transmission output shaft with a second cone pulley pair; and
at least one chain which connects the first cone pulley pair to the second cone pulley pair in a torque-transmitting manner.

16. A drive train comprising the wraparound gear mechanism of claim 15 and including:
a drive unit with an output shaft,
at least one consumer, wherein the output shaft is connected with a variable step-up transmission ratio to the at least one consumer by a chain of the wraparound gear mechanism for transmission of torque.

* * * * *